(12) United States Patent
Sun et al.

(10) Patent No.: US 6,704,282 B1
(45) Date of Patent: Mar. 9, 2004

(54) VPN TUNNEL REDIRECTION (75) Inventors: Joseph Tsyr-Shya Sun, Milpitas, CA (US); Luis A. Daly, Santa Clara, CA (US); Chung-Wen Soung, Los Gatos, CA (US); Tapan Lala, San Jose, CA (US); Frank Pereira, Pleasanton, CA (US); Zhidan Cheng, Sunnyvale, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/345,662

(22) Filed: Jun. 30, 1999

(51) Int. Cl.[7] .............................. H04L 1/00; H04L 12/56

(52) U.S. Cl. ....................................... 370/237; 370/401

(58) Field of Search .......................... 370/229, 237–238, 370/235, 468, 401–406, 230–236, 465, 466; 709/203, 223, 224, 225, 226, 227, 105, 104

(56) References Cited

U.S. PATENT DOCUMENTS

| | | | | |
|---|---|---|---|---|
| 5,325,362 A | * | 6/1994 | Aziz | 370/94.3 |
| 5,951,694 A | * | 9/1999 | Choquier et al. | 709/203 |
| 6,094,437 A | * | 7/2000 | Loehndorf et al. | 370/420 |
| 6,157,649 A | * | 12/2000 | Peirce et al. | 370/401 |
| 6,215,782 B1 | * | 4/2001 | Buskens et al. | 370/350 |
| 6,341,127 B1 | * | 1/2002 | Katsube et al. | 370/352 |
| 6,415,027 B1 | * | 7/2002 | Malik | 379/221.01 |

* cited by examiner

*Primary Examiner*—Chau Nguyen
*Assistant Examiner*—Soon-Dong Hyun (57) ABSTRACT

Virtual Private Network (VPN) tunnel redirection is accomplished by automatically redirecting tunnel initiator or network source for incoming call to another tunnel terminator or network destination according to traffic load, resource availability, or system reliability in VPN environment. Pointed terminator redirects call by sending special call clear message to tunnel initiator with IP address of recommended terminator in pool or set during PPP authentication. Initiator terminates current session with pointed terminator, establishes tunnel and/or session with recommended terminator, and starts processing again without terminating incoming call.

16 Claims, 12 Drawing Sheets

Case I : No redirection

① Incoming call from AC
② Report current connection information & query (Load_Balance_Lookup_Query)
③ Get reply from LBS - no redirection needed (Load_Balance_Lookup_Reply)
④ PPP negotiation and application data packets
......... Hello messages

FIG. 4

Case II : Redirection

AC first issues an incoming call to NS1, and NS1 redirects the call to NS2 according to the query result from LBS (1) Incoming call from AC (2) Report current connection information & query (Load_Balance_Lookup_Query)

(3) Get reply from LBS - redirect NS2 (Load_Balance_Lookup_Reply)

(4) Disconnect & redirection request to AC (5) Incoming call from AC (6) Report current connection information & query (Load_Balance_Lookup_Query)

(7) Get reply from LBS - no redirection needed (Load_Balance_Lookup_Reply)

(8) PPP negotiation and application data packets

............... Hello messages

PQ calculation:

| Factors | Factor value | Factor weigh | PQ subtotal |
|---|---|---|---|
| Resources | 90% | 70 | 63 |
| Forwarding Capability | 70% | 30 | 21 |
| Latency | N/A | 0 | 0 |
| Reliability | N/A | 0 | 0 |
| | | System PQ value : | 84 |

| Message Types | Option(s) |
|---|---|
| Load_Balance_Lookup_Query | Load Balance Factors & current Definite Factors (including MLP bundle ID, if any) |
| Load_Balance_Lookup_Reply | IP address of the recommended NS' |
| Load_Balance_Info_Report | Load Balance Factors (& MLP bundle ID, if any) |
| Load_Balance_Hello | support list for every Definite Factor |

FIG. 8B

| | | Definite Factors | | Load Balancing Factors | | | |
|---|---|---|---|---|---|---|---|
| NS | age | tunnel | MLP bundle ID list | factor 1 | factor 2 | factor ... | PQ |
| 10.0.0.1 | 9 sec | protocol list | pointer to ID list | 80% | 60% | ... | |
| 10.0.0.2 | 7 sec | protocol list | pointer to ID list | 90% | 80% | ... | |
| ... | | | | | | | |
| ... | | | | | | | |

FIG. 8C

Case I : No redirection

① Incoming call from AC
② Broadcast query (Load_Balance_Lookup_Query)
③ Get reply from every NS (Load_Balance_Lookup_Report)
④ Load balance calculation
⑤ PPP negotiation and application data packets
............ Hello messages

FIG. 9

Case II : Redirection

AC first issues an incoming call to NS1, and NS1 redirects the call to NS2.

① Incoming call from AC

② Broadcast query (Load_Balance_Lookup_Query)

③ Get reply from every NS (Load_Balance_Info_Report)

④ Load balance calculation

⑤ Disconnect & redirection request

⑥ Incoming call from AC

⑦ Broadcast query (Load_Balance_Lookup_Query)

⑧ Get reply from every NS (Load_Balance_Info_Report)

⑨ Load balance calculation

⑩ PPP negotiation and application data packets

·············· Hello messages

| Message Types | Option(s) |
|---|---|
| Load_Balance_Lookup_Query | None (MLP bundle ID, if any) |
| Load_Balance_Info_Report | Load Balance Factors (& MLP bundle ID search result, if any) |
| Load_Balance_Hello | support list for every Definite Factor |

FIG. 11B

|  |  | Definite Factors | |
|---|---|---|---|
| NS | age | tunnel protocol support | factor ... |
| 10.0.0.1 | 9 sec | protocol support list | |
| 10.0.0.2 | 14 sec | protocol support list | |
| ... | | | |
| ... | | | |

FIG. 12A

| Query Sequence Number : | | | |
|---|---|---|---|
| NS | PQ value | MLP bundle ID search | replied? |
| 10.0.0.1 | 80 | not match | yes |
| 10.0.0.2 | 75 | not match | yes |
| ... | | | |
| ... | | | |

FIG. 12B

VPN TUNNEL REDIRECTION

FIELD OF INVENTION

Invention relates to electronic networking, and particularly to techniques for tunnel redirection in Virtual Private Networks (VPN).

BACKGROUND OF INVENTION

Conventional digital networks use VPNs to achieve improved performance between network nodes. In large-scale VPN environments, tunneling devices may handle large number of tunnels and sessions. Hence, network scalability may be achieved through load sharing, e.g., wherein multiple tunnel terminators cooperate to balance load among themselves.

Prior load-sharing mechanism is implemented in tunnel initiators. In particular, such mechanisms are often statically configured or perform look-ups through preconfigured database for tunnel terminator according to incoming user information. Thus, when tunnel terminator is overloaded or unreliable and cannot handle more sessions, then such mechanisms have no way to accept and process incoming call. Accordingly, known mechanisms use tunnel initiators which generally do not properly manage resources or load-sharing and reliability of tunnel terminators, and, furthermore, cannot easily scale for multiple corporate sites. Thus, there is a need for solution to improve scalability and stackability of VPN servers.

SUMMARY OF INVENTION

Invention resides in VPN tunnel redirection scheme, wherein tunnel initiator is redirected to another tunnel terminator according to traffic load, resource availability, and system reliability in VPN environment.

Preferably, pointed terminator redirects call by sending special call clear message to tunnel initiator with IP address of recommended terminator in pool during PPP authentication. Initiator terminates current session with pointed terminator, establishes tunnel and/or session with recommended terminator, and starts session again without terminating incoming call.

DETAILED DESCRIPTION OF PREFERRED EMBODIMENTS

Network interconnection and management technique and/or system provides VPN or equivalent network tunnel-initiator with the ability of redirecting the call to another tunnel terminator or target according to various specified or monitored network performance factors, such as traffic load, resource availability, and/or reliability.

Preferably, one or more pointed terminator or other directed signal target redirects or alternately interconnects call or other message by sending or otherwise indicating special or selected call-clear or other equivalent message to one or more tunnel initiator or other signal source with Internet Protocol (IP) or other specified address of recommended terminator in pool or given set of accessible network nodes during Point-to-Point Protocol (PPP) authentication or other comparable access procedure.

Generally, in VPN or other similar network environment, initiator terminates or otherwise holds one or more current tunnel, session, or other communication channel with pointed terminator; establishes or otherwise initiates tunnel, session, or other communication channel with recommended terminator; and then starts again or otherwise continues original communication event or flow, without effectively terminating incoming call.

Accordingly, present tunnel redirection scheme and system serves to improve scalability and stackability of VPN servers or other equivalent network accessible processors or nodes, by more effectively managing resources, as well as load-sharing and reliability of VPN tunnel terminators. Hence, under present tunnel redirection approach, tunnel terminator is more reliably not overloaded, and may handle more sessions or calls.

In particular, as described herein, load balancing is significantly improved among pool or qualified set of VPN Network Servers (NS), wherein preferably same network Operating System (OS) is run by various NS, and each NS may redirect incoming calls from Access Concentrator (AC) to appropriate NS within pool, either by own calculation or assistance of Load Balance Server (LBS) 24.

Figure 1:
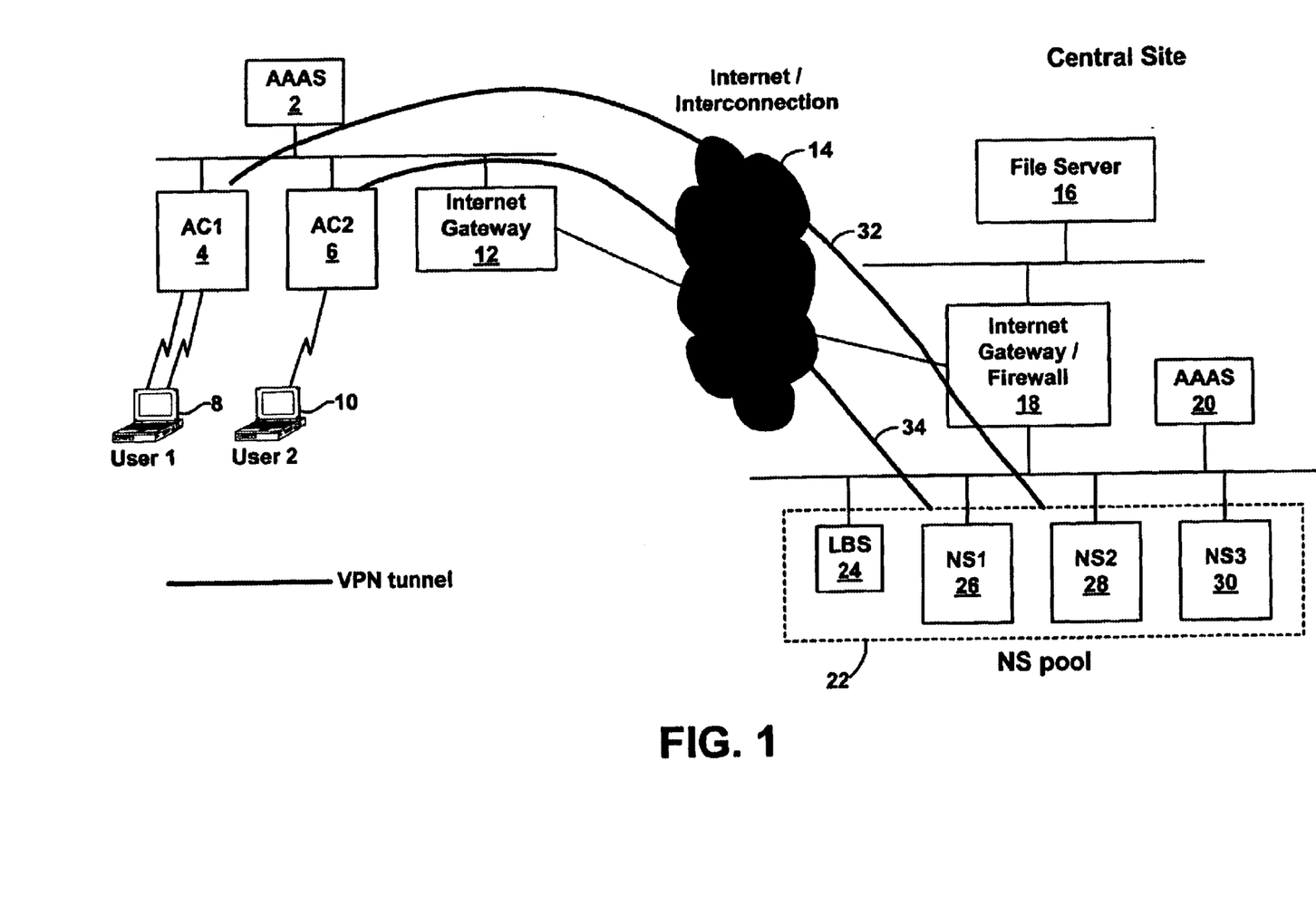
FIG. 1 is a general network system diagram for implementing the present invention.

FIG. 1 shows general network or other distributed interconnection configured for VPN tunnel 32, 34 functionality between NS pool 22 in central site and AC nodes 4, 6 through Internet or other digital interconnection 14. As shown, various terminals or processors with appropriate network access hardware and/or software (e.g., user-1 8 and user-2 10) may access through Internet or other local or wide area network (LAN/WAN) file server 16 or other network node or address, optionally through one or more Internet gateway, firewall or other secure interface 12, 18.

Initially, calls or equivalent user messaging is received by one or more AC 4, 6; then one or more VPN tunnels 32, 34 are initiated from AC 4, 6 to NS in pool 22. Preferably, such tunneling is configured according to Authentication-Authorization-Accounting Server (AAAS) 2, 20 or other network management or administration processor, software module, or internal data base, as well as various network parameters, such as dialing number or dialed number.

Furthermore, upon receiving one or more calls, NS 26, 28 thereby issues query or other message or signal to LBS 24 or other NS 30 to determine whether applicable NS 26, 28 is qualified or otherwise prepared to process incoming call. Hence, if applicable NS 26, 28 is determined by LBS 24 or other NS 30 to be qualified, then incoming call or packet processing proceeds.

Otherwise, in accordance with preferred tunnel-redirection implementation, one or more AC 4, 6 is informed or otherwise signaled to attempt contacting or otherwise consider reconnecting to other recommended NS 26, 28, 30 in pool 22 or one or more other network-accessible distributed server resource set. Then, upon receiving recommended NS list or other available server addresses, AC 4, 6 may thereby establish VPN tunnel 32, 34 with recommended NS 26, 28, 30, and start or continue same call or process without hanging-up or otherwise interrupt user call.

Figure 2:
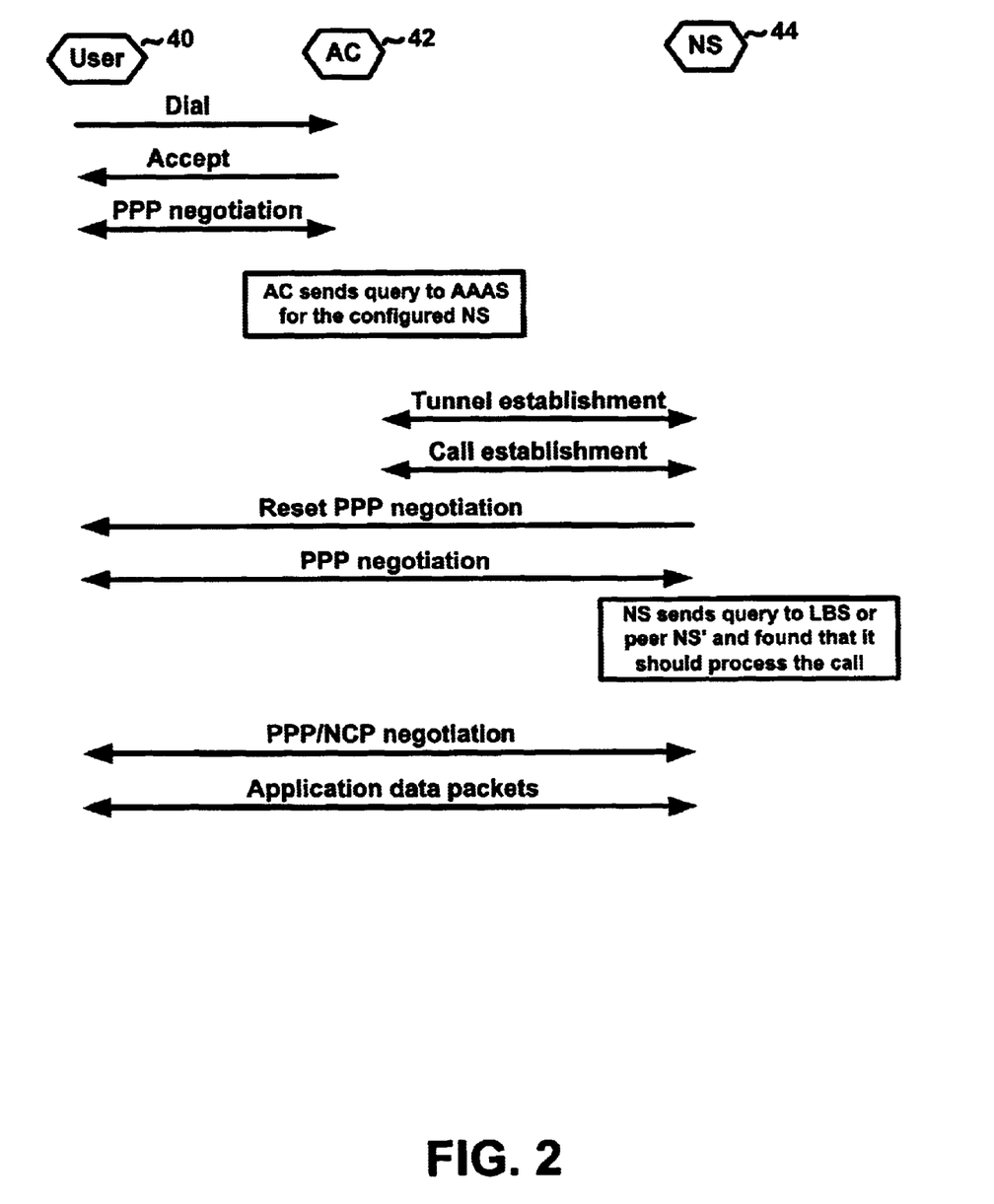
FIG. 2 is an operational diagram showing call handling without tunnel redirection in one embodiment of the present invention.

FIG. 2 flow diagram of operations between user 40, AC 42, and NS 44 shows incoming call or other communications signal handling, where original NS qualifies to process call, and tunnel redirection need not be performed. As shown, initially user 40 dials call to AC 4, 42, such that AC 4, 42 indicates acceptance, and user 40 and AC 42 then negotiate PPP protocol. Then, AC 42 sends query to AAAS 2 for configured NS 44.

Tunnel or similar network coupling or interconnection is established between AC 42 and NS 44 (if tunnel does not already exist), and call is established. PPP negotiation between user 40 and NS 44 is reset, such that PPP is negotiated therebetween. NS 44 sends query to LBS 24 or peer NS, and determines whether call is to be processed. PPP (or so-called NCP) negotiation and transmission of application data packets occurs between user 40 and NS 44.

Figure 3:
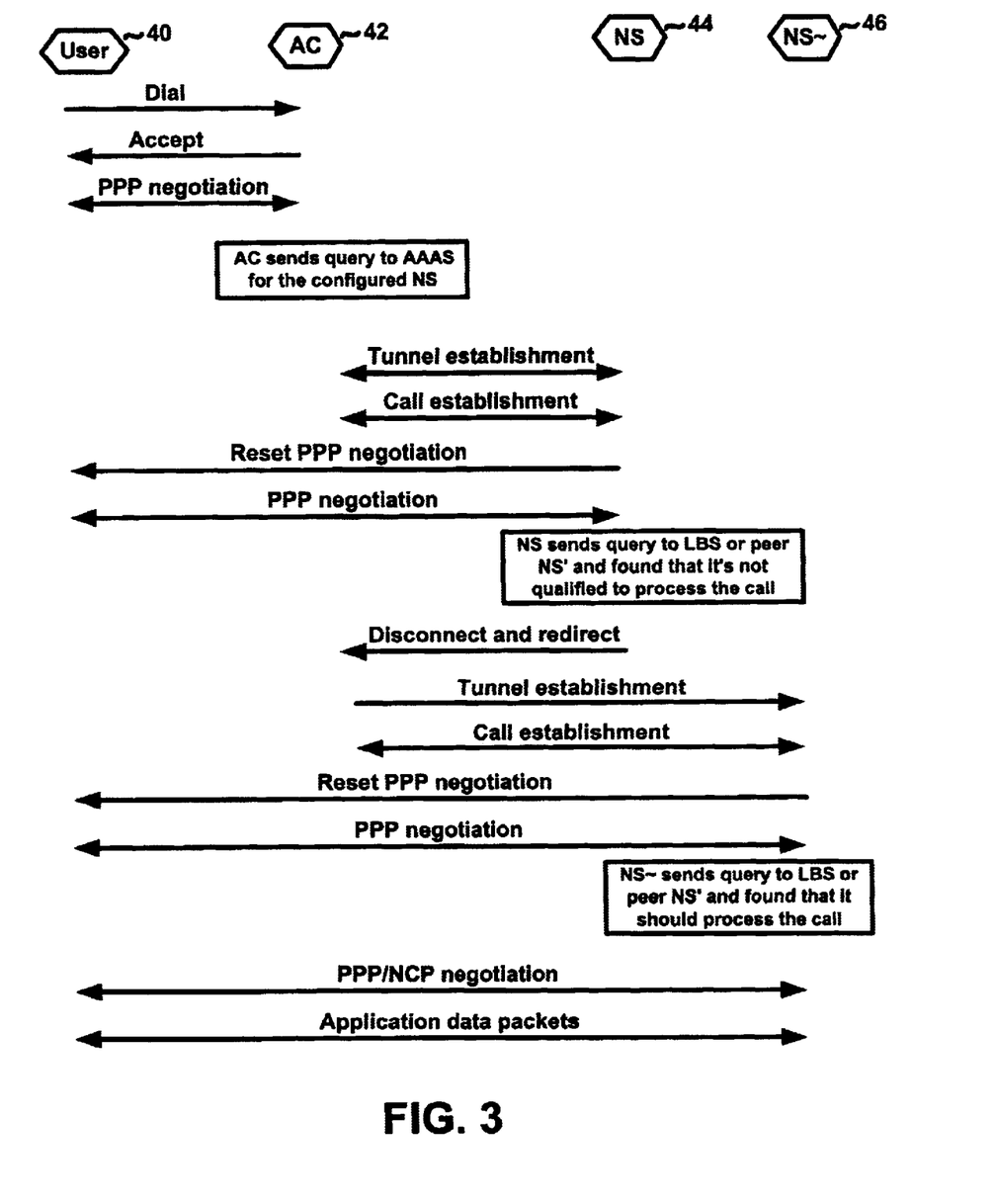
FIG. 3 is an operational diagram showing call handling with tunnel redirection in one embodiment of the present invention.

FIG. 3 flow diagram of automated call processing operations between network nodes, user 40, AC 42, NS 44, and NS~46 shows incoming call or other communications signal handling, where original NS redirects call to other NS according to own calculation or that of LBS 24, and tunnel redirection is performed. As shown, initially user 40, 8 dials call to AC 4, 42, such that AC 42 indicates acceptance, and user 40 and AC 42 negotiate PPP protocol. Then, AC 42 sends query to AAAS 2 for configured NS 44.

Tunnel or other similar network channel is established between AC 42 and NS 44 (if tunnel does not already exist), and call is established. PPP negotiation between user 40 and NS 44 is reset, such that PPP is negotiated therebetween. NS 44 sends query to LBS 24 or peer NS, and determines whether call is to be processed. As appropriate, NS 44 disconnects and redirects call with AC 42, and tunnel and call are established between AC 42 and NS 46~. PPP negotiation between user 40 and NS 46 is reset, such that PPP is negotiated therebetween. NS~46 sends query to LBS 24, or peer NS, and determines whether call is to be processed. PPP/NCP negotiation and transmission of application data packets occurs between user 40 and NS~46.

LBS 24 preferably serves as load balance engine, module or apparatus to determine which NS is/are qualified to handle incoming calls. In this centralized manner, NS servers in pool 22 then report status and query to/from LBS 24. Optionally, load-balance management and processing resides in each NS for querying other NS servers and deciding accordingly. LBS 24 operation reduces network traffic, but may affect reliability during downtime.

Figure 4:
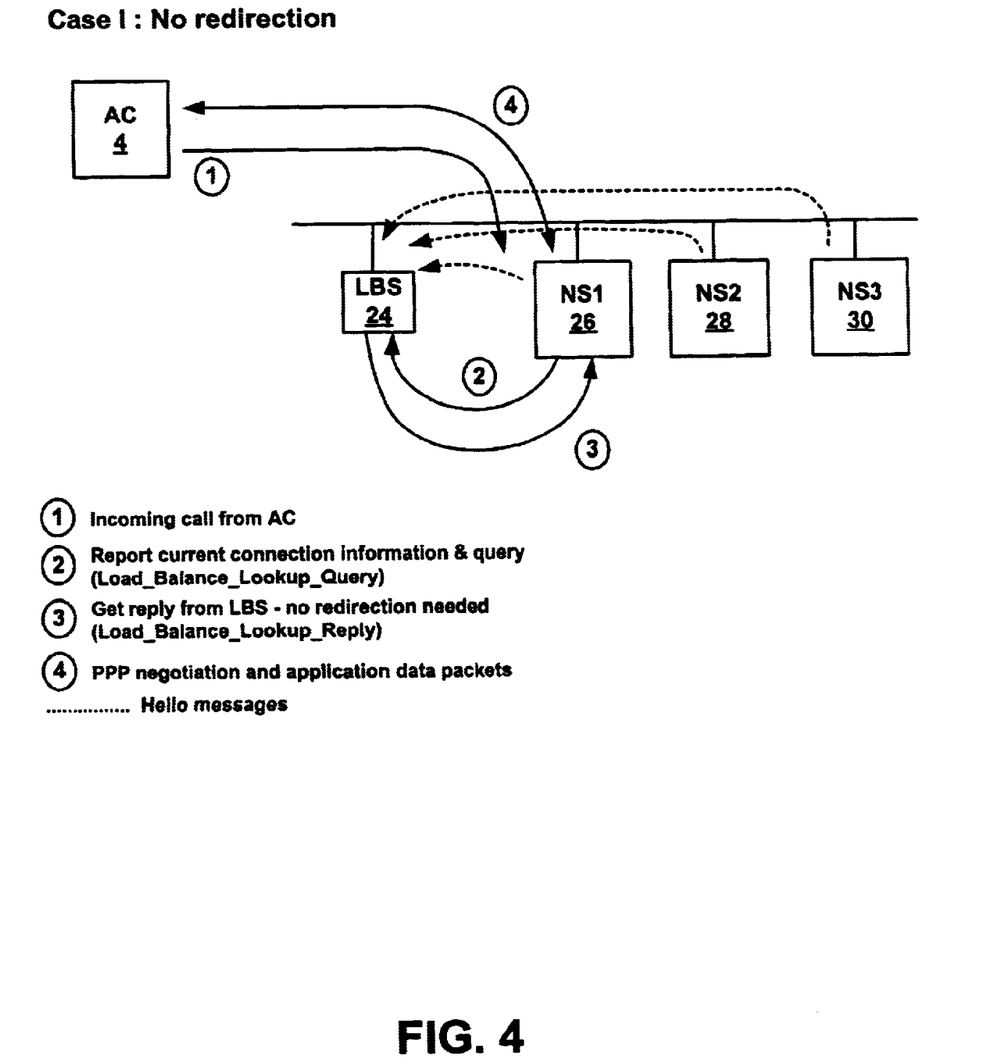
FIG. 4 is a network diagram for no tunnel redirection case in one embodiment of the present invention.

LBS 24 load-balancing tasks may be implemented in stand-alone application server, as well as other existing application server or functional module. Preferably, LBS 24 functionality is platform-independent. As shown in FIG. 4 for no-redirection case of LBS call processing, LBS 24 tasks include: maintaining current connection status for various NS, e.g., NS reports to LBS 24 when user dials-in or hangs-up (Load_Balance_Lookup_Query); indicating to NS incoming call for redirection (e.g., Load Balance Lookup Reply), and redirection target; listening to messages (e.g., "hello") from various NS and qualifying each NS in pool, as well as learning protocol support list from messages; and facilitating PPP negotiation and application data packet transmission.

Figure 5:
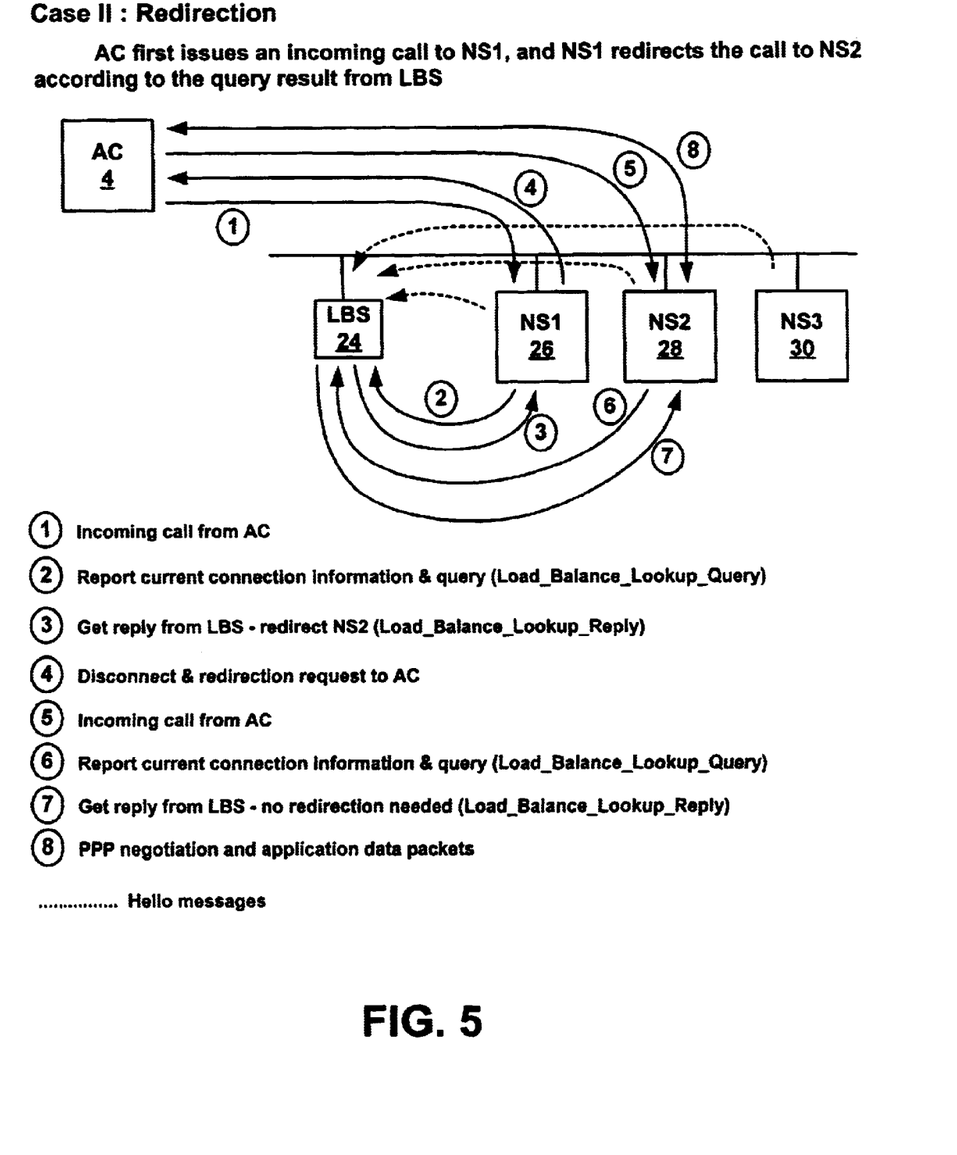
FIG. 5 is a network diagram for tunnel redirection case in one embodiment of the present invention.

FIG. 5 network diagram shows LBS 24 operation for redirection case, whereupon AC 4 issues incoming call to NS1 26, and NS1 26 redirects call to NS2 28 according to query result from LBS 24. In particular, as shown, current connection information and query (e.g., Load_Balance_Lookup_Query) are reported by NS1 26 to LBS 24, and LBS 24 provides reply to NS1 26 for NS2 28 redirection (e.g., Load_Balance_Lookup_Reply). NS1 26 to AC 4 disconnect and redirection request.

Then, according to tunnel-redirection scheme, incoming call from AC 4 is received by NS2 28, which reports to LBS 24 current connection information and query (e.g., Load_Balance_Lookup_Query). LBS 24 replies to NS2 28 that no redirection needed (e.g., Load_Balance_Lookup_Reply). PPP negotiation and application data packet transmission are facilitated between AC 4 and NS2 28.

Preferably, tunnel re-direction decisions and processing may be based on various factor types, such as so-called definite and load balance factors. Definite factors apply to any NS considered for handling redirected call. Load balance factors apply to priority quotient (PQ) calculations for NS servers which meet specified definite factors. NS servers with qualified PQ value may receive redirected call(s).

Representative definite factors include: tunnel protocols supported by NS, (e.g., L2TP/UDP, L2TP/FR, PPTP, etc.); and PPP Multi-Link (MLP) bundling of identifiers (ID), such as MLP endpoint descriptor or/and user name (applicable to MLP user sessions).

Representative load-balance factors include: free resources for handling incoming sessions, including physical resources, such as hardware interfaces, and logical resources, such as local port and IP addresses; current average forwarding capability of NS; latency or response time, (i.e., round trip time measured between NS and AC); and system reliability, based on possible error counters.

Figure 6:
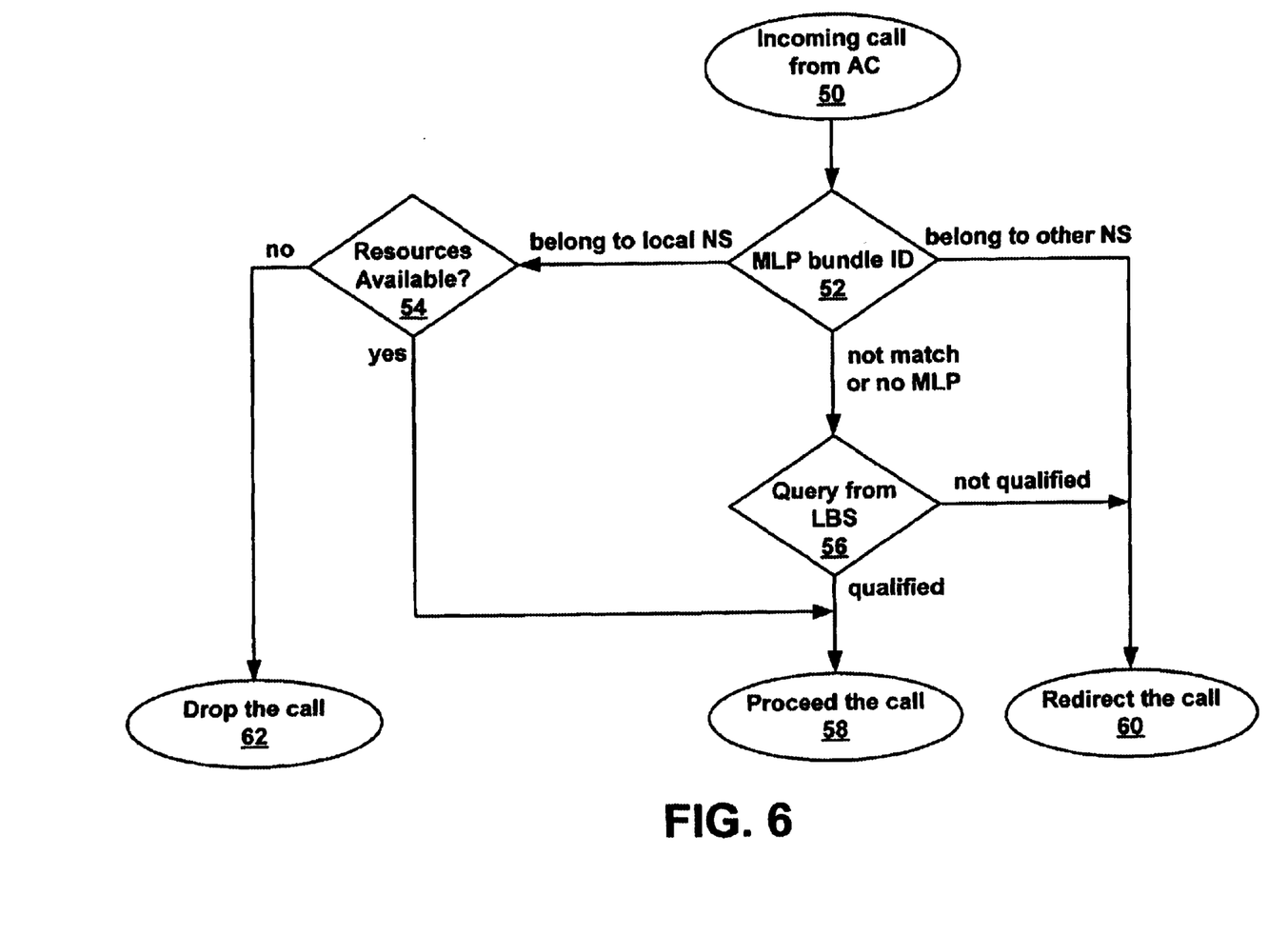
FIG. 6 is a flow chart showing operational steps in one embodiment of the present invention.

FIG. 6 flow chart generally shows processor-automated decision-making process for handling calls 50. Initially, when NS receives call in MLP user session, MLP bundle ID or other identifier is checked 52 against local MLP bundles or set. If incoming call is determined to be member link of local bundle, then process call 54 while resources available, or terminate 62 call when out of resources.

If not in local bundle, then NS checks with LBS to determine if any NS owns bundle, so that call is redirected 60 to that NS. But if nobody owns bundle, LBS queries and scans 56 definite factors and/or load balance factors from NS, then determines NS server(s) qualified to process call. Hence, if original NS is determined to be qualified, call processing proceeds 58, otherwise, redirection performed 60 to qualified ones.

In case of non-MLP user configuration, original NS checks with LBS and directs NS as to whether qualified to process call. NS proceeds with call process or call redirection. Preferably, when LBS is queried by NS, database is scanned, NS servers not meeting definite factors are thereby eliminated. Then, PQ values may be calculated for remaining NS server(s) per load balance factors, and IP addresses are provided for qualified NS servers (i.e., having higher PQ values). At least one unused session is reserved properly to provide tunnel redirection.

PQ priority indicator is calculated by LBS for each NS in pool. PQ generally represents NS quality as candidate for processing incoming call among NS pool. In particular, PQ is determined as aggregate value of multiplication results from factor value (e.g., in percentage form), as well as corresponding weight (e.g., 0–100 range) for each load balance factor. Hence, to qualify NS for call processing, PQ is calculated to be within certain pre-determined range, e.g., below highest PQ in pool.

If highest PQ of pool is 90, and qualification range is 10, for example, then NS is qualified when PQ is between 80 and 90. This calculation method eliminates multiple redirections for single call in relatively dynamic environments. Moreover, PQ value may be calculated using load balance factors, each factor being numerically represented in percentage format and having weight indicating importance level. Note that such factor percentage values may be derived from implementation-specific calculations, such as following:

$$\text{Resources (\%)} = \frac{\text{Available capacity for incoming sessions (90 free sessions)}}{\text{Total session capacity (100 sessions)}}$$

$$\text{Forwarding Capability (\%)} = 1 - \frac{\text{System average throughput over a period of time (30 Mb/s)}}{\text{System max throughput w/o performance degradation (100 Mb/s)}}$$

Figure 7A:
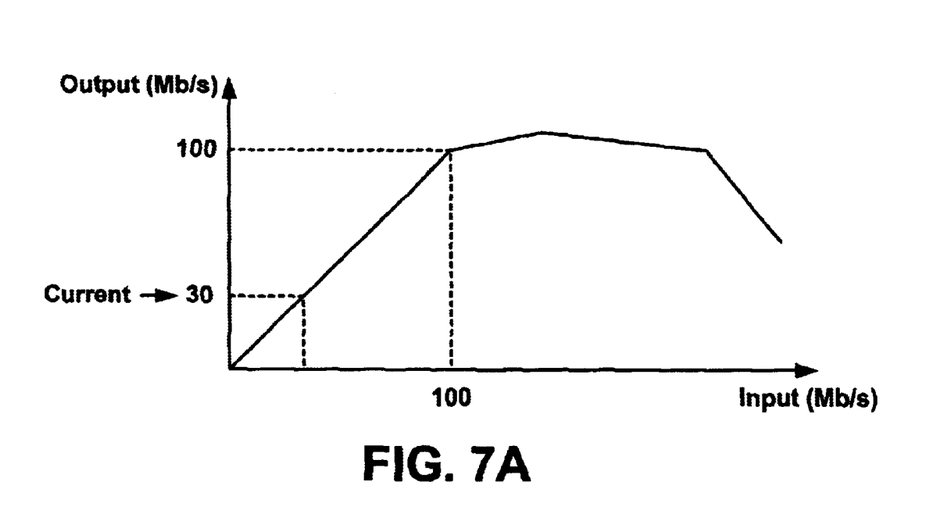
FIG. 7A is a representative system performance chart according to one embodiment of the present invention.
Figure 7B:
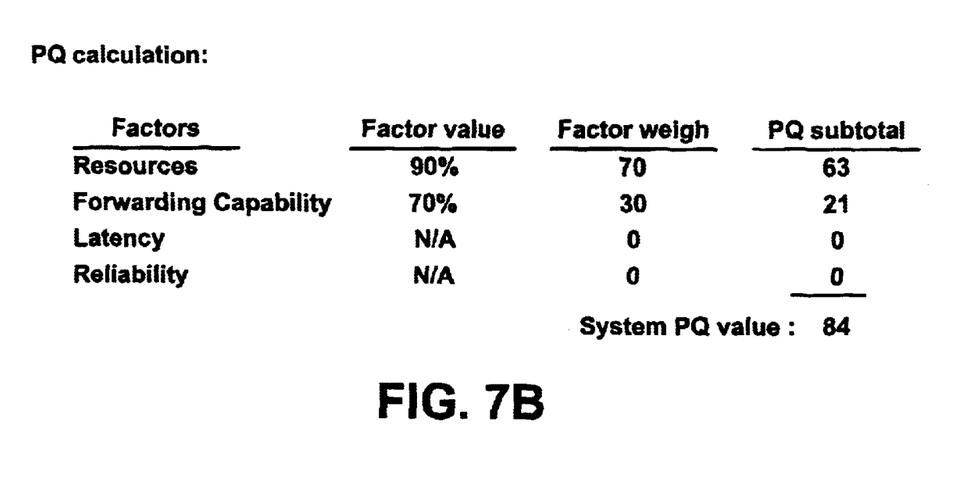
FIG. 7B is a table for calculating Priority Quotient (PQ) according to one embodiment of the present invention.

Additionally, representative system performance chart in FIG. 7A and factor-calculation table in FIG. 7B indicate that 70% forwarding capacity remains.

In preferred embodiment, communication is provided between LBS 24 and NS 26, 28, and/or 30 to enable tunnel redirection. Initially, upon receiving incoming call session, NS sends current load balance factors to LBS 24 through appropriate message (e.g., Load_Balance_Lookup_Query), and LBS 24 replies with appropriate message (e.g., Load_Balance_Lookup_Reply) to indicate if redirection is needed. If redirection is needed, then qualified NS list is provided with such message; otherwise, IP address of NS sending query is provided.

Optionally, appropriate message (e.g., Load_Balance_Info_Report ) is sent to LBS 24 to indicate status at session termination. Moreover, MLP bundle ID is sent for last member link of bundle, so LBS 24 may remove corresponding MLP bundle ID from list.

Figure 8A:
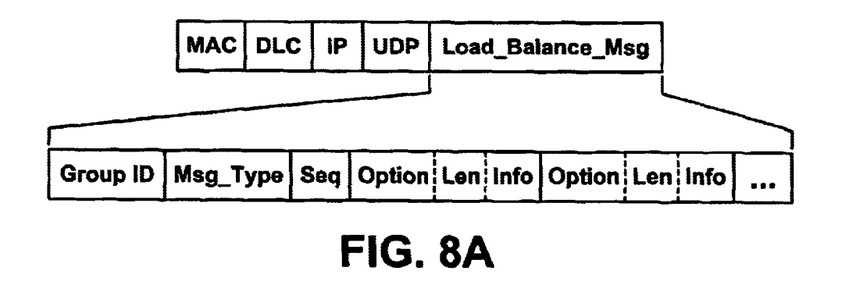
FIG. 8A is a representative message format according to one embodiment of the present invention.
Figure 8B:
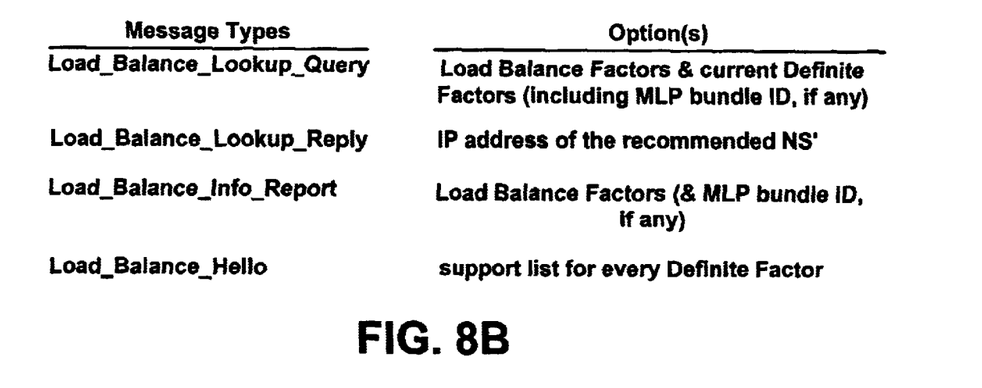
FIG. 8B is a table for representative message types according to one embodiment of the present invention.

Preferably, NS servers each send "Hello" or equivalent message to LBS 24 while no message for load balancing purpose has been exchanged during specified time. Hence, when newly-added NS server joins pool, LBS 24 may learn new member on-the-fly through Hello messaging, as well as the support list of definite factors. NS-LBS communication formatting may use so-called UDP format for transport layer, preferably with proprietary UDP port number, for example, using representative message format shown in FIG. 8A, wherein specified representative message types are shown in FIG. 8B.

Note that when new member joins NS pool 22, appropriate message (e.g., Load_Balance_Hello) is sent to LBS 24, so that LBS 24 learns of newly-added member. In addition, support list for each definite factor is sent, and LBS 24 recognizes applicable NS support. For tunneling factor, NS may only support PPTP tunneling protocol, for example, and LBS 24 does not redirect L2TP tunnel call thereto.

But when NS sends appropriate message (e.g., Load_Balance_Lookup_Query) to LBS 24, current value for each definite factor may be sent accordingly, and original NS informs LBS 24 of current tunneling protocol (e.g., L2TP), and NS supporting such tunneling protocol are considered for redirection. As appropriate, message types and option encoding and length are defined and optimized for particular implementation. Further, group ID may identify pool members, i.e., amid multiple NS pools on central network. Also, sequence numbering is provided to match lookup query and reply.

Figure 8C:
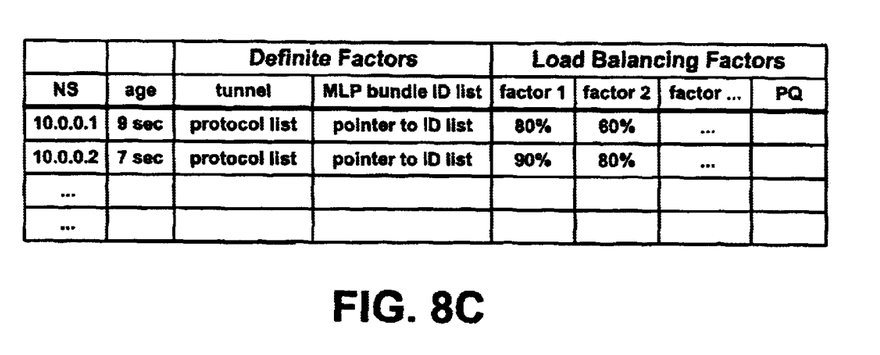
FIG. 8C is a representative load balance table according to one embodiment of the present invention.

LBS 24 is implemented to provide current system and/or connection information for NS server(s) in pool 22, as shown in representative load balance table in FIG. 8C. Initially, upon receiving specified messages (e.g., Load_Balance_Lookup_Query or Load_Balance_Info_Report), LBS 24 updates load balance factors of associated table entry. In case of received Load_Balance_Lookup_Query message, LBS 24 makes redirection decision by checking definite factors, and PQ calculation according to pre-determined weight for each factor.

Preferably, LBS 24 uses pre-determined PQ qualification range, upon which redirection decision is based. Thus, if NS sending query falls into applicable range, then redirection is not needed; otherwise, pre-determined number of IP addresses of qualified NS servers is passed. On receiving Load_Balance_Hello message, LBS 24 updates definite factors associated table entry.

Moreover, if no load-balance message is exchanged during specified time-out period (e.g., 10 seconds), upon receiving any message, LBS 24 expects periodic Hello messages from every NS, and age of corresponding table entry is reset accordingly. If age exceeds pre-determined time-out value, then LBS 24 clears entry, and corresponding NS is assumed to be not functional. LBS 24 may periodically increase age for each entry, preferably at specified frequency. Pre-determined LBS parameters may include: weight for each factor, PQ qualification range, maximum number of NS servers that LBS 24 may recommend for redirection, and/or entry age time-out value.

LBS 24 functionality or software instructions may reside for processing or execution on local AAAS 24. By internal query procedure, LBS 24 may preview potential maximum number of channels for incoming MLP user and (re-)direct such call to most appropriate NS according to resource consideration. To redirect call properly, NS informs AC 4, 6 IP addresses of recommended NS 26, 28, or 30. Thus, call or session in progress may need to be terminated, such that new call or session to recommended NS is established.

Optionally, NS passes IP addresses to AC through standard tunneling message including attribute and value, (e.g., L2TP's Call-Disconnect-Notify message with Attribute-Value Pair (AVP), or advisory message field in cause code AVP). Also, NS may pass IP addresses to AC through tunneling message with appropriate message type, (i.e., special call disconnect message interpreted and processed by AC.) Furthermore, NS may pass IP addresses to AC through TCP or UDP or other specified port.

Upon receiving disconnect message, AC properly terminates session with NS (i.e., sending confirmation message back per tunneling protocol), and picks-up recommended IP addresses, and establish new call thereto. During NS-AC communication process, AC must not hang-up customer call.

In an alternate embodiment, load-balance engine or equivalent calculation functionality or module is provided in certain NS or NS pool 22. In comparison to centralized LBS 24 approach, one or more NS in pool 22 may have built-in load-balance engine, and query messages are thus sent to other NS servers. In distributed processing manner, NS servers may broadcast messages to rest of network to collect responses from other NS servers, and therefore enable distributed redirection decision-making. In such manner, NS server(s) do not necessarily report call terminations to peer NS servers.

Figure 9:
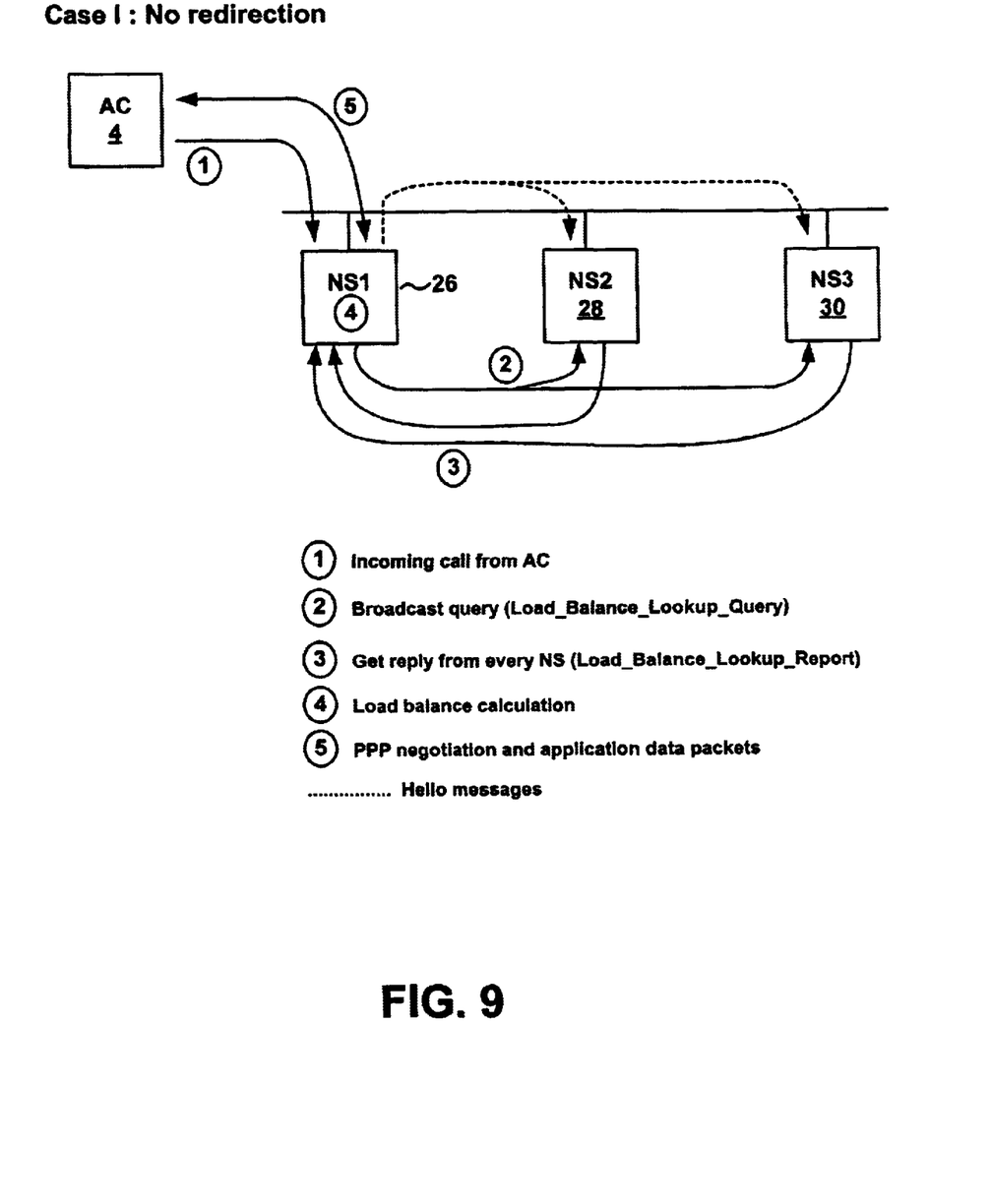
FIG. 9 is a network diagram for no tunnel redirection case in one embodiment of the present invention.

FIG. 9 network diagram shows no-redirection case when load-balance engine is provided in NS, i.e., no LBS processing. Here, upon receiving incoming call from AC 4, NS 26 broadcasts query packet (i.e., Load_Balance_Lookup_Query) to all other NS servers 28, 30 in NS pool, then receives reply (i.e., Load_Balance_Lookup_Report) from each other NS. Load-balance factors preferably need not be stored in NS, but real-time load-balance calculation is performed against factors, such that final PQ value is stored for comparison purpose. Thus, when reply messages (i.e., Load_Balance_Lookup_Report) are received, and PQ values are calculated and stored, then NS 26 may decide whether redirection is needed.

Prior to PQ calculation for peer NS server(s), NS 26 checks definite factors, and eliminates NS servers not supporting current value of any definite factor. Peer NS server(s) informs NS 26 support list using appropriate message (i.e., Load_Balance_Hello). Peer NS may indicate by using appropriate message (i.e., Load_Balance_Hello), for example, that such NS supports certain protocol, such as PPTP, regarding definite factor of tunneling protocol, then upon receiving appropriate call (i.e., L2TP), peer is not considered for receiving call.

Furthermore, NS 26 may query other definite factor(s), such as MLP bundle ID for appropriate calls, such that report message (i.e., Load_Balance_Info_Report) indicates certain conditions, such as: NS has member link of bundle already; NS does not have bundle with same member link; or NS is in process of resolving bundle ownership.

If NS being queried has bundle, then original NS redirects call to that NS. But if no NS has bundle, then original NS embarks on query process, definite factors are checked, and PQ value is calculated for servers meeting definite factors.

NS attempt to resolve bundle ownership may be applicable, for example, when MLP user dials 2 B-channels, (i.e., B1, B2), and tries to connect B1 with NS1 and B2 with NS2 simultaneously, both NS servers broadcasting appropriate message (e.g., Load_Balance_Lookup_Query) to each other, neither one claiming ownership over user, and both channels possibly not being bundled together.

Preferably, each NS stores MLP bundle ID temporarily for query before sending appropriate message (e.g., Load_Balance_Lookup_Query), as well as checks saved bundle ID when queried. NS servers may save MLP bundle ID, and report being in process of resolving ownership. Resolution may be accomplished such that NS with larger IP address over local LAN interface wins; and loser server redirects MLP call to winner server.

Figure 10:
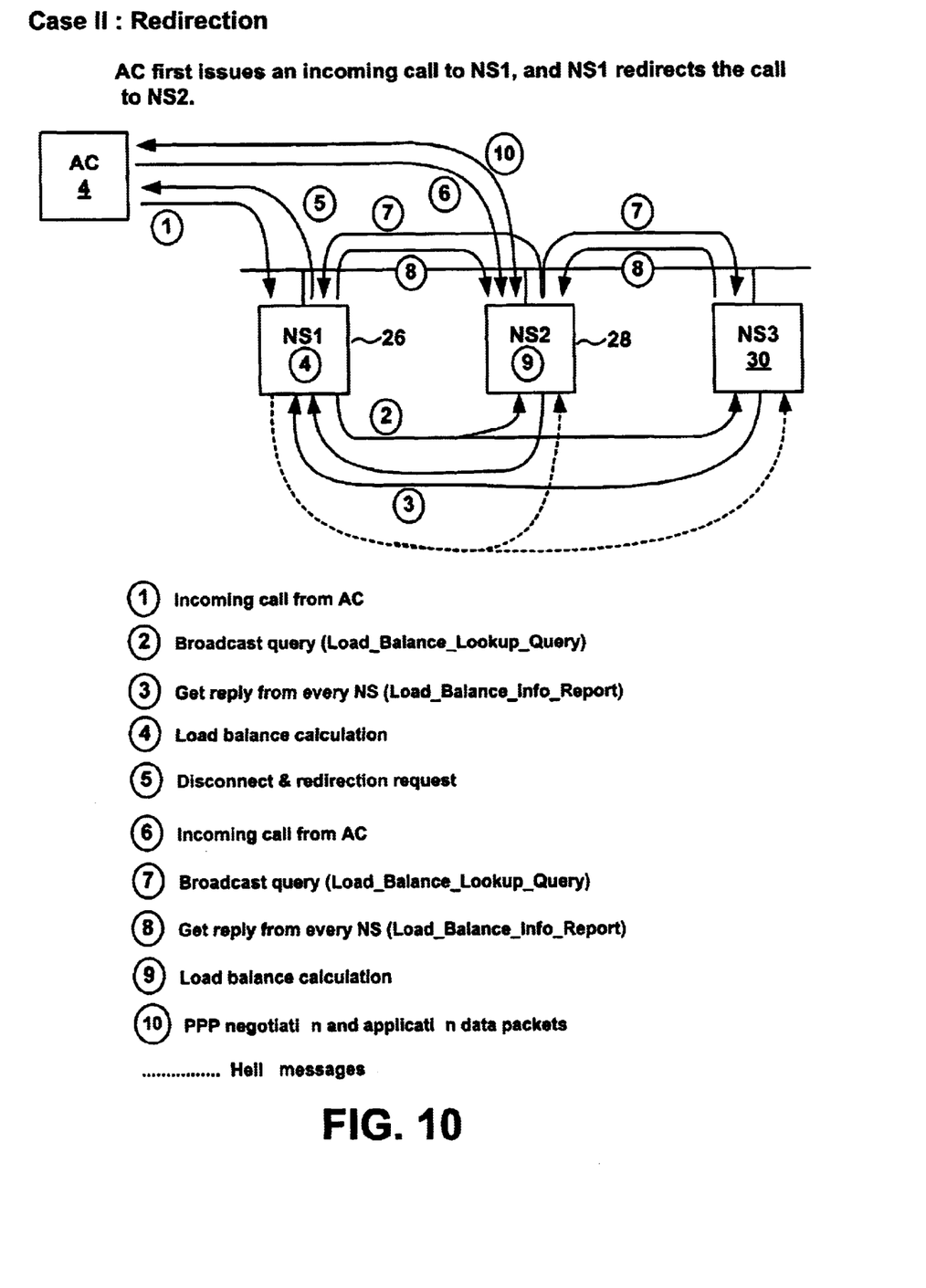
FIG. 10 is a network diagram for tunnel redirection case in one embodiment of the present invention.

FIG. 10 network diagram shows redirection case when load-balance engine is provided in NS, i.e., no LBS processing. As shown, AC 4 issues incoming call to NS1 26, and NS1 26 redirects call to NS2 28. Upon receiving incoming call from AC 4, NS 26 broadcasts query packet (i.e., Load_Balance_Lookup_Query) to all other NS servers 28, 30 in NS pool, then receives reply (i.e., Load_Balance_Lookup_Report) from each other NS. Load-balance factors preferably need not be stored in NS, but real-time load-balance calculation is performed against applicable factors, e.g., such that final PQ value is stored for comparison purpose. Thus, when reply messages (i.e., Load_Balance_Lookup_Report) are received, and PQ values are calculated and stored, then NS 26 may decide whether redirection is needed.

After load-balance calculation, NS1 26 provides disconnect and redirection request to AC 4. Then, incoming call is provided by AC 4 to NS2 28. Appropriate broadcast query message (i.e., Load_Balance_Lookup_Query) is sent by NS2 28 to other NS nodes 26, 30, which accordingly reply with appropriate message (i.e., Load_Balance_Info_Report).

Again, load-balance calculation is performed by NS2 28 as described herein using load-balancing scheme using appropriate load-balance factors. NS2 28 also performs PQ calculation according to load-balancing scheme described herein. Moreover, PPP negotiation and application data packets are provided between AC 4 and NS2 28.

Figure 11A:
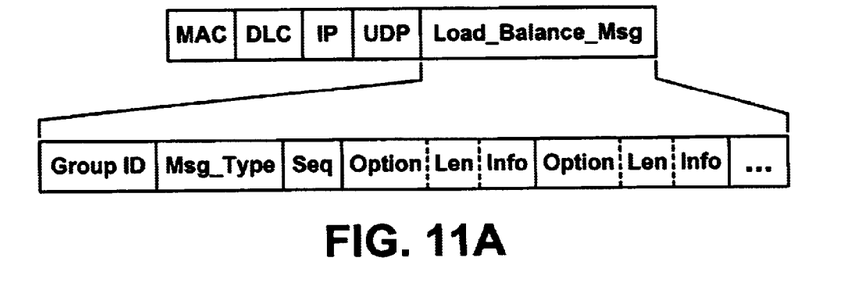
FIG. 11A is a representative message format according to one embodiment of the present invention.
Figure 11B:
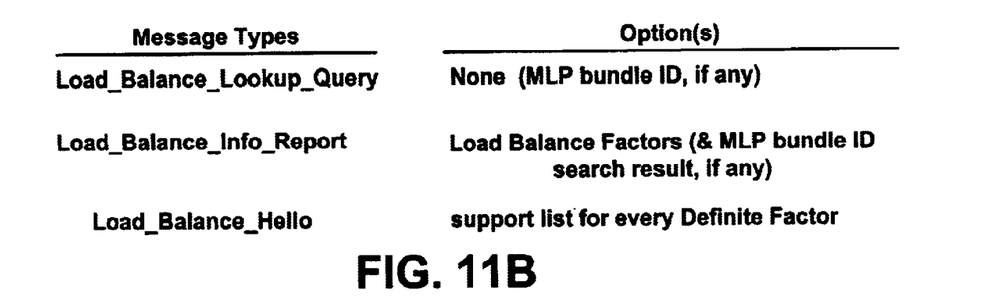
FIG. 11B is a table for representative message types according to one embodiment of the present invention.

To query load balance factors, NS2 28 may send appropriate broadcast message (i.e., Load_Balance_Lookup_Query ) to other NS servers 26, 30, which reply with appropriate message (i.e., Load_Balance_Info_Report), preferably according to message format shown in FIG. 11A. In particular, as shown in FIG. 11B, various message types and options apply in present no-LBS/redirection case. Note that each NS may broadcast Hello-message to other NS, preferably when no broadcast messages has been transmitted and/or received in specified time delay, e.g., 10 seconds.

In Load_Balance_Info_Report message, various load_balance factor options are definable, and MLP bundle ID search results may be reported, such as: ID matches with current user session locally; ID does not match; and ID also under query by NS.

Regarding load-balance engine implementation for no-LBS/redirection case, each NS maintains peer table in digital storage, preferably listing valid NS servers in pool. System processor or manager may increase age periodically for each entry. Hello message is broadcasted to other NS servers when no query message is sent or transmitted within specified time delay, e.g., 10 seconds.

Figure 12A:
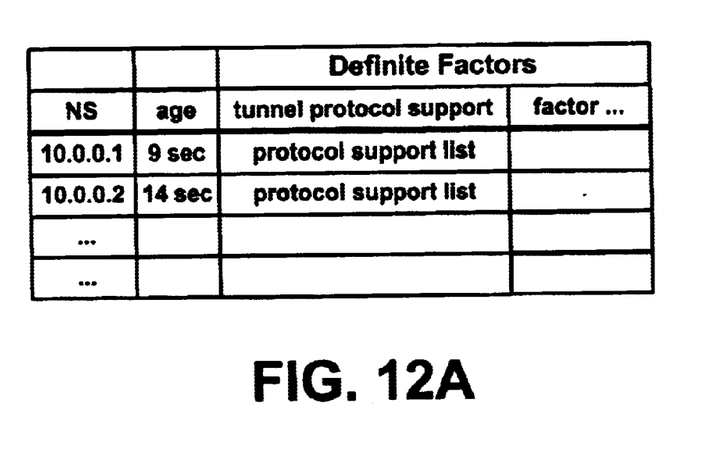
FIG. 12A is a table for representative definite factors according to one embodiment of the present invention.

Upon receiving appropriate Load_Balance message, NS resets corresponding age field; and when age exceeds predetermined time-out value, entry is deleted, and no further query message is accordingly sent. For newly-added NS, each NS in pool learns appropriate information automatically from Load_Balance_Hello message, as well as support list for definite factors. FIG. 12A shows representative table or equivalent data structure with NS, age, and definite factor values.

Figure 12B:
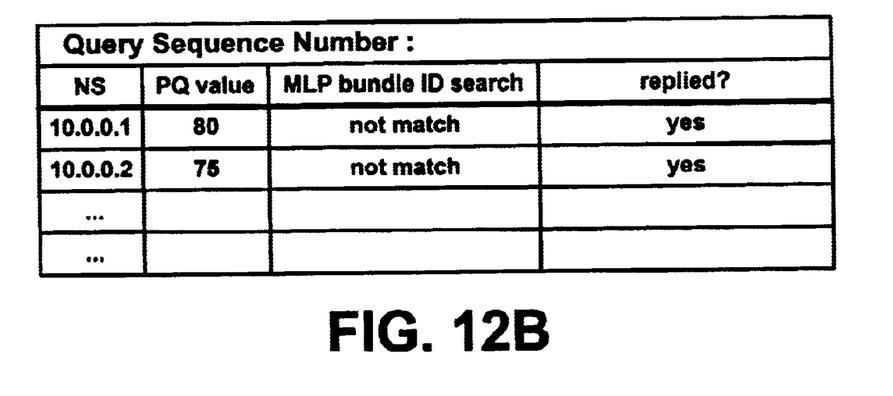
FIG. 12B is a table for representative query sequence numbers according to one embodiment of the present invention.

Optionally, another table or data structure, as show in FIG. 12B, is created and stored dynamically during query process, i.e., to keep NS query information, such as query sequence numbers. Such data structure or database may be rendered free, obsolete, clear, or otherwise completed, upon making redirection decision. Additionally, MLP bundle ID search results may be included in such data structure, as well as definite factors for query with each MLP call.

Furthermore, MLP bundle ID may be saved in temporary storage before query message is sent to resolve any MLP race condition. Hence, when query message is sent, pre-determined period timer starts in case any NS does not reply. When timer indicates that not all replies are received, call are dropped preferably to protect MLP bundling integrity. Time-out protection scheme prevents situation when 2 B-channels from single user may be provided to different NS servers.

Preferably, at least one unused session is reserved by NS controller or system manager for certain applications, such as user dial-in and any associated redirection. In addition, as described herein, each NS controller or system manager may be configured with various parameters, such as: weight for each factor; PQ qualification range; maximum possible number of NS recommendable for redirection; entry age time-out value; and query time-out value. Foregoing described embodiments of the invention are provided as illustrations and descriptions. They are not intended to limit the invention to precise form described. In particular, Applicants contemplate that functional implementation of invention described herein may be implemented equivalently in hardware, software, firmware, and/or other available functional components or building blocks. Other variations and embodiments are possible in light of above teachings, and it is thus intended that the scope of invention not be limited by this Detailed Description, but rather by claims following.

What is claimed is:

1. In a digital network, a method for tunnel redirection between a plurality of nodes, the method comprising the steps of:
    selecting a preferred candidate in a server pool as a redirection target to process an incoming call;
    directing a tunnel initiator to a first tunnel terminator; and
    redirecting the tunnel initiator to a second tunnel terminator according to one or more specified network factors, wherein at least one specified network factor is determined using a priority indicator calculated for at least one network server.

2. The method of claim 1 further comprising the step of: sending at least one message between a network server (NS) and an Access Concentrator (AC) to indicate a redirection condition.

3. The method of claim 1 comprising the step of: calculating by a stand-alone Load Balance Server (LBS) at least one of the specified network factors.

4. The method of claim 1 wherein: the specified network factors comprise at least one load balance factor or definite factor.

5. The method of claim 1 further comprising the step of: broadcasting a message to at least one tunnel terminator according to a time-out procedure.

6. The method of claim 1 wherein: the priority indicator is calculated according to weight value.

7. The method of claim 1 wherein: the second or first tunnel terminator interactively sends or receives a Hello message, a Report message, or a Query message.

8. The method of claim 1 further comprising the step of: storing in at least one network accessible data structure at least one definite factor, load balancing factor, or sequence number.

9. The method of claim 1 wherein: the tunnel initiator comprises an access concentrator, the first tunnel terminator and the second tunnel terminator respectively comprise a first network server and a second network server in a network server pool, whereby an incoming call from the access concentrator is re-directable between the first and second network servers effectively to improve network load balances.

10. The method of claim 9 wherein: the incoming call is re-directable by a standalone server to a qualified network server, the standalone server storing at least one connection parameter for a plurality of network servers in the network server pool, and the standalone server receiving at least one message from each of the plurality of network servers to generate a recommended server list.

11. The method of claim 9 wherein: the incoming call is re-directable or processable by a selected network server in the network server pool which determines whether an identifier of the incoming call is associated with a specified bundle.

12. In a digital network for interconnecting a plurality of network nodes, a load balancing module comprising:
    means for providing a first virtual private network (VPN) tunnel between a first node and a second node; and
    means for providing a second VPN tunnel between the first node and a third node;
        whereby a call from the first node is re-directable through the first or second VPN tunnel for transmission to the second node or the third node and the call is redirected by a central server for selecting a preferred candidate in a server pool according to one or more load balance or definite factors, at least one factor being associated with a priority quotient which is calculated using a weight value, at least one factor being stored in a database.

13. The module of claim 12 wherein: a plurality of messages are sent between the first node and the second node or the third node, at least one message being sent in response to a monitored delay, at least one message comprising a Hello message, a Report message, or a Query message, a protocol support list being determined according to one or more sent messages.

14. Computer-automated network call process comprising the steps of:
    receiving an incoming call from a network source;
    automatically determining whether the call belongs to a local set;
    automatically processing the call when the call belongs to the local set, and processing resource is available;
    automatically redirecting the call when the call belongs to an other set; and
    automatically qualifying the call when the call does not belong to a specified set wherein the call is qualified by checking one or more definite load balance factors to select one or more network destinations for receiving the call.

15. The process of claim 14 wherein: one or more of the factors is associated with each selected network destination.

16. The process of claim 14 wherein the incoming call is automatically redirected without a user associated with initiating the incoming call re-dialing such call.

* * * * *